Dec. 4, 1945.    K. MEYER ET AL    2,390,162
METHOD FOR PRODUCING LIGHT POLARIZING BODIES
Filed Dec. 9, 1940
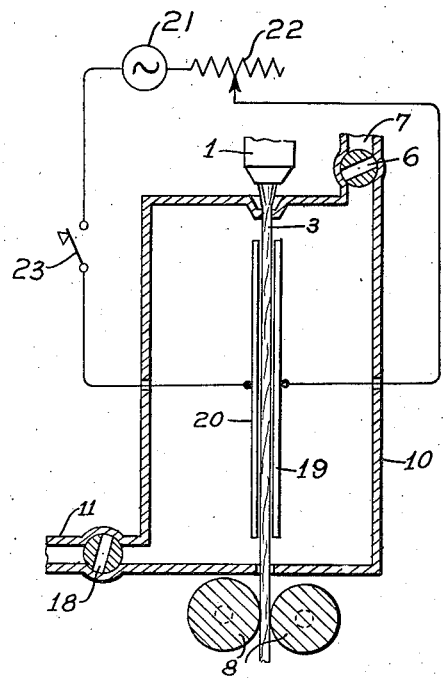
Inventors
Kurt Meyer,
Hans Lapp,
By
Attorney.

Patented Dec. 4, 1945

2,390,162

UNITED STATES PATENT OFFICE 2,390,162

METHOD FOR PRODUCING LIGHT POLARIZING BODIES

Kurt Meyer, Berlin-Zehlendorf, and Hans Lapp, Klein-Machnow, near Berlin, Germany; vested in the Alien Property Custodian Application December 9, 1940, Serial No. 369,228
In Germany August 8, 1939

5 Claims. (Cl. 18—47.5)

This invention relates to the manufacture of light polarizing elements comprising transparent media in which light polarizing particles are dispersed in uniform orientation.

The invention particularly deals with the production of light polarizing foils in which the light polarizing particles dispersed in the transparent medium are oriented under the influence of electric forces.

Heretofore light polarizing elements of this type have been produced by dissolving the transparent media, as for instance, cellulose derivatives in which the polarizing particles are to be retained in suitable solvents. The light polarizing particles, as for instance, herapathite, or other doubly refracting and dichroitic substances, were dispersed in these solutions and the liquid compositions produced in this manner were poured by suitable pouring devices upon bases of the required type. Uniform orientation, required for the polarization of light, is then brought about by causing electrical forces to act on the polarizing particles in these liquid compositions, and finally the liquid compositions thus treated are converted into solid light polarizing elements by evaporating the solvents.

In carrying out the process as outlined above, it has been found that owing to the evaporation of the solvents during the final stage of orientation, strata or areas of a viscosity different from that of the remainder of the liquid may be produced within the very liquid compositions containing the polarizing particles. These conditions are encountered particularly when solvents of high volatility are employed.

The presence of layers or films of differential viscosity exerts an influence upon the orientation of the particles owing to the creation of shearing forces within the liquid. It may even lead to the production of areas filled with non-oriented particles in the polarizing bodies. Such areas containing non-oriented polarizing particles, occur especially whenever pieces of these surface films tear off and drop directly upon the pouring base.

The light polarizing elements produced while proper orientation of the particles was impeded through the formation of strata or films of differential viscosity are of poorer quality and lower commercial value.

It has been discovered that the formation of these films or the formation of surface layers of differential viscosity in the liquid carrier mass of light polarizing particles may be avoided during the stage of orientation, thereby also enhancing the commercial value of the product, by causing the orientation of the light polarizing particles to take place in an atmosphere which has been enriched or is permeated by vapors of the solvents contained in the liquid carrier or of one or more of the ingredients of the same—in which case then a formation of films on the surface of the liquid does not occur and areas of differential viscosity are not formed.

The invention, therefore, deals with the production of light polarizing elements from carrier solutions of transparent media containing light polarizing particles in dispersion and in which the said light polarizing particles are oriented by electric forces, the production taking place in an atmosphere which has been enriched or permeated by the solvents contained in the liquid carrier, or by one or more ingredients of said solvents, in such manner that the formation of surface layers or films of differential viscosity is prevented during the orientation.

This method of production, according to the invention, furnishes uniform, contiguous or self-contained light polarizing elements, particularly foils of excellent quality. The method can be performed in different ways. It is not subject to the employment of any particular apparatus.

Apparatus for carrying out the method are diagrammatically illustrated in the accompanying drawing to which reference is made in the following specification.

A further example of carrying out the process includes the steps of conveying gases, as air, nitrogen, carbon dioxide and the like, charged with the solvent vapors over the fluids while the orientation of the light polarizing particles within these liquid carriers takes place. The conveyance of these gases over the fluid masses advisably takes place at the temperature of the latter.

In the drawing, a chamber 10, equipped with an inlet 11 controllable by a valve 18 for suitable vapors is provided on the chamber 10, while the vent 6 with control means 7 permits to regulate the saturation of the ambient atmosphere within the chamber 10. In the embodiment, the orientation of the polarizing colloidal crystals within the mass poured from the machine 1 is initiated through an electrostatic field set up between the electrodes 19 and 20 chargeable from the alternating current source 21 in the circuit of which a regulating resistance 22 and a switch 23 also may be provided. Here also, it may be admitted that the initiation of the orientation of these polarizing crystals by the electrostatic field itself is known, and no claims are directed to this step of orientation. The ambient atmosphere, however, is controlled, whereby a more uniform degree of orientation is induced since, owing to the uniformly saturated atmosphere within the chamber 10, uniform viscosity must necessarily be produced in the polarizing mass flowing through the chamber.

While the described process is applicable to the production of various light polarizing bodies, particularly foils it has been proven to be of especial value in making light polarizing bodies by pouring the liquid transparent carrier of polarizing particles upon a base, and causing the mass leaving the pouring slot not to be applied directly to the pouring base, but maintaining the poured liquid in free suspension over a relatively great drop between the pouring point and the base, before applying it to the base.

The invention is not restricted to the examples indicated solely for the purpose of illustration. It includes all methods by which the light polarizing bodies are produced from transparent solutions of media containing light polarizing particles within an atmosphere which has been charged or even saturated with the solvents contained in the carrier or with one or more of the ingredients of said solvents respectively, the entire process being carried out in such manner that the formation of layers or films of differential viscosity is prevented on the surface during the orientation process.

We claim:

1. Process for the production of light polarizing bodies comprising forming a solution containing light polarizing particles, causing a film of the solution to fall freely through an enclosed zone, simultaneously imposing an electrostatic stress on the film for orienting the particles in said zone, retarding evaporation of the solution solvent in said zone whereby formation of film areas of differential viscosity is prevented, and thereafter evaporating the solution solvent to convert the solution into a solid body.

2. Process for the production of light polarizing bodies comprising forming a solution containing light polarizing particles, causing a film of the solution to fall freely through an enclosed zone, simultaneously imposing an electrostatic stress on the film for orienting the particles in said zone, providing said zone with a volatile ingredient of the solution solvent to retard evaporation of the solution solvent in said zone whereby formation of the film areas of differential viscosity is prevented, and thereafter evaporating the solution solvent to convert the solution into a solid body.

3. Process for the production of light polarizing bodies comprising forming a solution containing light polarizing particles, pouring the solution to fall freely in a film through an enclosed zone, simultaneously imposing an electrostatic stress on the film to orient the particles therein, retarding evaporation of the solution solvent in said zone whereby formation of film areas of differential viscosity is prevented, and thereafter evaporating the solution solvent to convert the solution into a solid body.

4. Process for the production of light polarizing bodies comprising forming a solution containing light polarizing particles, causing a film of the solution to fall freely through an enclosed zone, simultaneously imposing an electrostatic stress on the film for orienting the particles in said zone, providing said zone with a porous mass containing a volatile ingredient of a solution solvent to retard evaporation of the solution solvent in said zone whereby formation of film areas of differential viscosity is prevented, and thereafter evaporating the solution solvent to convert the solution into a solid body.

5. Process for the production of light polarizing bodies comprising forming a solution containing light polarizing particles, causing a film of the solution to fall freely through an enclosed zone, simultaneously imposing an electrostatic stress on the film for orienting the particles in said zone, passing a current of gas charged with a volatile ingredient of the solution solvent over the solution to retard evaporation of the solution solvent in said zone whereby formation of film areas of differential viscosity is prevented, and thereafter evaporating the solution solvent to convert the solution into a solid body.

KURT MEYER.
HANS LAPP.